United States Patent
Landuyt

(10) Patent No.: US 12,162,775 B2
(45) Date of Patent: Dec. 10, 2024

(54) PROCESS FOR PRODUCING POTASSIUM SULPHATE

(71) Applicant: TESSENDERLO GROUP NV, Brussels (BE)

(72) Inventor: Peter Landuyt, Brussels (BE)

(73) Assignee: TESSENDERLO GROUP NV, Brussels (BE)

(*) Notice: Subject to any disclaimer, the term of this patent is extended or adjusted under 35 U.S.C. 154(b) by 719 days.

(21) Appl. No.: 17/421,405

(22) PCT Filed: Jan. 8, 2020

(86) PCT No.: PCT/EP2020/050327
§ 371 (c)(1),
(2) Date: Jul. 8, 2021

(87) PCT Pub. No.: WO2020/144237
PCT Pub. Date: Jul. 16, 2020

(65) Prior Publication Data
US 2022/0081308 A1     Mar. 17, 2022

(30) Foreign Application Priority Data
Jan. 8, 2019  (EP) .................... 19150853

(51) Int. Cl.
*C01D 5/02* (2006.01)
*F27B 5/10* (2006.01)
*F27D 17/00* (2006.01)

(52) U.S. Cl.
CPC .............. *C01D 5/02* (2013.01); *F27B 5/10* (2013.01); *F27D 17/004* (2013.01); *F23J 2215/10* (2013.01); *F27D 2017/007* (2013.01)

(58) Field of Classification Search
CPC ............ C01D 5/02; F27B 5/10; F27D 17/004
See application file for complete search history.

(56) References Cited

U.S. PATENT DOCUMENTS 4,303,619 A   12/1981   Kobayashi et al.
4,342,737 A    8/1982   Iwashita et al.

FOREIGN PATENT DOCUMENTS

| CN | 1118335 A | 3/1996 |
| CN | 204454616 U | 7/2015 |
| GB | 610275 A | 10/1948 |

OTHER PUBLICATIONS

International Search Report for PCT/EP2020/050327 issued on Mar. 13, 2020.
(Continued)

*Primary Examiner* — James A Fiorito
(74) *Attorney, Agent, or Firm* — David Owen; Hoyng Rokh Monegier

(57) ABSTRACT

A process for the production of potassium sulphate by conversion of potassium chloride and sulphuric acid using a muffle furnace, said furnace comprising a reaction chamber and a combustion chamber, wherein in the reaction chamber potassium chloride (KCl) and potassium hydrogen sulfate ($KHSO_4$) are reacted to form potassium sulphate while supplying heat to the reaction chamber from the combustion chamber, wherein the combustion chamber has at least a pair of regenerative burners and wherein the process comprises the steps of alternatingly causing one of the regenerative burners to perform a combustion operation in the combustion chamber to heat the reaction chamber and another of the regenerative burners to perform a heat-regenerating operation in a regenerator, wherein the pressure in the combustion chamber is kept at a pressure of between 0.2 and 3 mbarg.

18 Claims, 1 Drawing Sheet

(56) References Cited

OTHER PUBLICATIONS

International Preliminary Report on Patentability for PCT/EP2020/050327 issued on Jun. 16, 2021.
Database WPI, Section Ch, Week 201565, Thomson Scientific, London, GB, Class E34, an 2015-54103K.

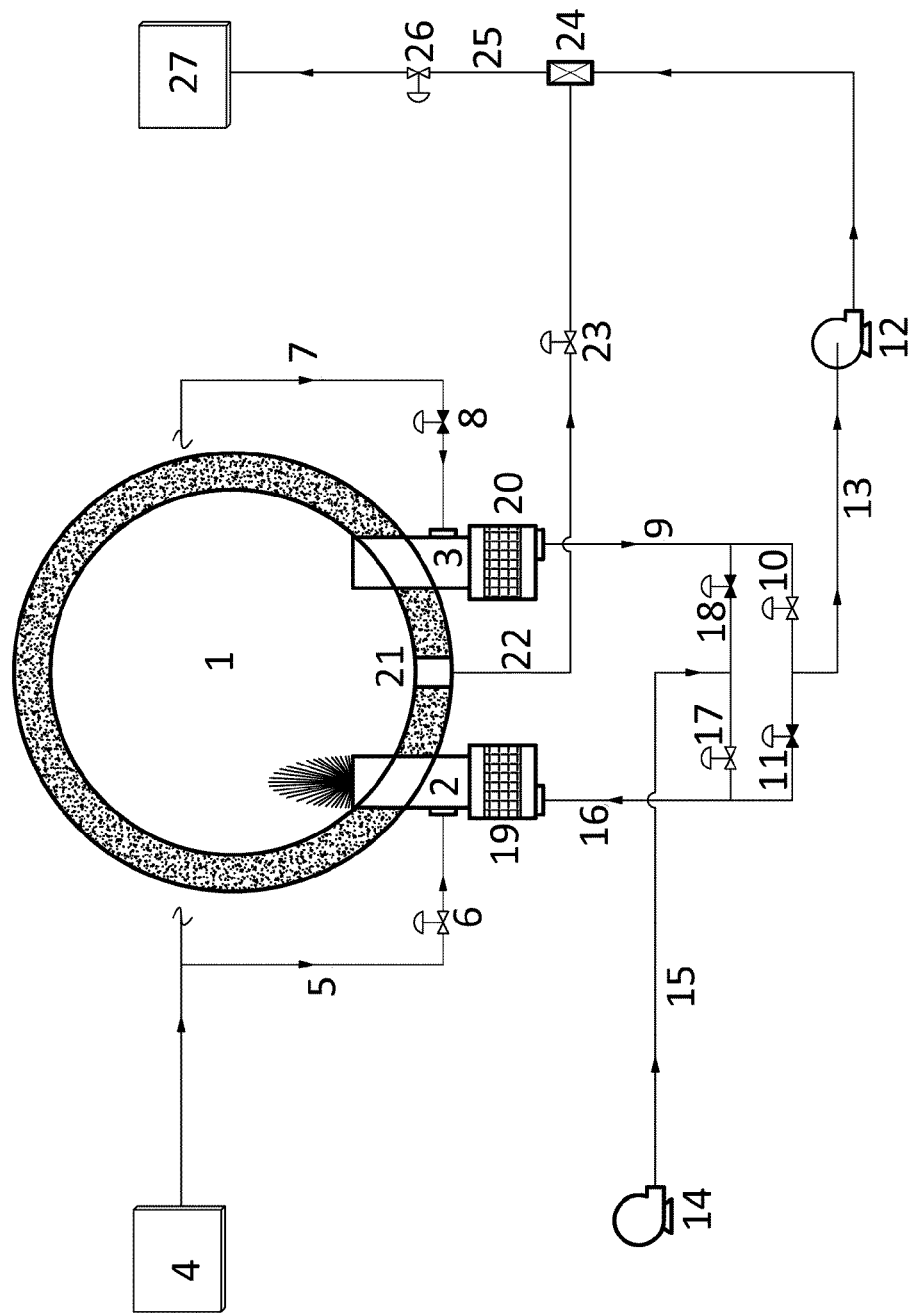

PROCESS FOR PRODUCING POTASSIUM SULPHATE

BACKGROUND OF THE INVENTION

1. Field of the Invention

An improved process for producing potassium sulphate is provided. More particularly, the present invention is concerned with a process of producing potassium sulphate in a Mannheim furnace.

2. Description of the Related Art

The Mannheim process is a well-known process for producing potassium sulphate ($K_2SO_4$). Generally, the process consists of two steps—an exothermic reaction of potassium chloride and sulfuric acid to potassium bisulphate and hydrogen chloride as a by-product, and an endothermic reaction to potassium sulphate and hydrogen chloride. The steps are shown by reaction formula (1) and (2).

$$KCl + H_2SO_4 \rightarrow KHSO_4 + HCl \quad \text{(1) Exothermic reaction}$$

$$KHSO_4 + KCl \rightarrow K_2SO_4 + HCl \quad \text{(2) Endothermic reaction}$$

Generally, the potassium sulphate obtained from the Mannheim process has moderate chloride content (2% to about 4% by weight). The use of potassium sulphate with high chloride values has become undesirable for the agriculture.

Therefore, the available prior art is directed to a great extent to producing a lower chloride product while the energy, cost and/or environmental efficiency of the method i.e. the Mannheim process has been neglected.

For example, U.S. Pat. No. 4,342,737 describes that KCl is reacted with sulfuric acid at an equivalent ratio of 1.07-1.40 at temperatures from about 250° C.-500° C. While this process does provide sulfate containing less chloride than that produced by the Mannheim process, it is still energy-intensive, requiring continuous heating.

The Mannheim process, as carried out currently, is performed in substantially the same manner as developed in Germany during the nineteenth century. It involves a furnace consisting of two parts, a combustion chamber at the top and a reaction chamber underneath, separated by a dome. An example of a Mannheim furnace is described in e.g. patent document U.S. Pat. No. 4,303,619.

The dome, a refractory layer, separates the combustion chamber and the reaction chamber causing heat transfer from the combustion chamber to the reaction chamber. Through a top inlet of the furnace potassium chloride and concentrated sulfuric acid are added into the reaction chamber and stirred.

As indicated in the reaction above, the second step in the reaction is endothermic i.e. heat needs to be foreseen above the reaction chamber. This heat is generally supplied by burning heavy fuel which heats up the furnace by convection but mainly radiation, while reaching a temperature in the combustion chamber in the range of from 950° C. to 1400° C. The higher the temperature of the combustion air and/or the oxygen concentration, the higher is the $NO_x$ concentration in the exhaust gas.

Hydrochloric acid (HCl) is released as gas during the production process and processed, as it is a useful and sellable product.

$NO_x$ reduction is an area of concern today. Thermally produced $NO_x$ is the largest contributor to these types of emissions. Thermal $NO_x$ is generated during the combustion process when nitrogen and oxygen are present at elevated temperatures. The two elements combine to form NO and/or $NO_2$.

Besides the environmental consequences of the Mannheim process, it is also known to be energy inefficient. Because of the high temperature at which the reaction is run, the Mannheim process uses approximately half a barrel of fuel oil per ton of sulfate. Also, due to the especially high temperature and non-uniform heat transfer, a substantial gradient and locally high temperature spots (hot spots) are formed across the combustion chamber's dome surface.

This leads to thermal stress and the corrosive conditions encountered are severe, for instance cracks and tears can be formed which induce HCl emission in combustion gasses while $NO_x$ is being formed at the hot spots.

The permeated HCl requires that the combustion equipment is coated with heat and corrosion resistant concrete. In the reaction room, parts of the equipment are fabricated of cast ferrous metal construction and are designed with thick cross sections. On the other hand, a frequent replacement of the metal parts is necessary incurring expenses for e.g. maintenance, replacements cost, lost production time.

To overcome the problems of the prior art, some recent developments are made on the design of the furnace. For example the Chinese utility model CN204454616 (U) provides a potassium sulfate reaction furnace which comprises a reaction furnace, an outer-layer furnace body surrounding the reaction furnace and a flame path arranged between the reaction furnace and the outer-layer furnace body, wherein a concentrated sulfuric acid feed opening and a potassium chloride opening are formed at the upper part of the reaction furnace. The reaction furnace is made from nichrome which is a heat resistant material.

However, the problem of the hot spots formed on the chamber's surface during the production process and the issues associated herewith are authentic. New developments are needed to obviate at least some of the above stated drawbacks.

It is therefore an object of the present invention to provide an effective and efficient process for the continuous industrial production of potassium sulphate in a muffle furnace, and in particular to provide said process allowing low $NO_x$ emissions while maintaining high combustion efficiency.

SUMMARY OF THE INVENTION

Accordingly, to attain the objective, the present invention provides a process for the production of potassium sulphate by conversion of potassium chloride and sulphuric acid using a muffle furnace, said furnace comprising a reaction chamber and a combustion chamber, wherein in the reaction chamber potassium chloride (KCl) and potassium hydrogen sulfate ($KHSO_4$) are reacted to form potassium sulphate while supplying heat to the reaction chamber from the combustion chamber, wherein the combustion chamber has at least a pair of regenerative burners and wherein the process comprises the steps of alternatingly causing one of the regenerative burners to perform a combustion operation in the combustion chamber to heat the reaction chamber and another one of the regenerative burners to perform a heat-regenerating operation in a regenerator, and wherein the pressure in the combustion chamber is kept at a pressure of between about 0.2 and about 3 mbarg.

The present invention furthermore provides the use of regenerative burners in a Mannheim process for producing potassium sulphate, wherein the pressure in the combustion chamber is kept between about 0.2 and about 3 mbarg.

DETAILED DESCRIPTION OF THE INVENTION

The present invention provides a process for the production of potassium sulphate by conversion of potassium chloride and sulphuric acid using a muffle furnace, said furnace comprising a reaction chamber and a combustion chamber,
wherein in the reaction chamber potassium chloride (KCl) and potassium hydrogen sulfate ($KHSO_4$) are reacted to form potassium sulphate while supplying heat to the reaction chamber from the combustion chamber,
wherein the combustion chamber has at least a pair of regenerative burners and
wherein the process comprises the steps of alternatingly causing one of the regenerative burners to perform a combustion operation in the combustion chamber to heat the reaction chamber and another one of the regenerative burners to perform a heat-regenerating operation in a regenerator, and
wherein the pressure in the combustion chamber is kept at a pressure of between about 0.2 and about 3 mbarg.

Generally, the peak temperature in the combustion chamber is about 1350° C. or lower. Preferably, the peak temperature in the combustion chamber is about 1300° C. or lower, and more preferably about 1250° C. or lower. Generally, the peak temperature in the combustion chamber is about 1050° C. or higher, preferably about 1100° C. or higher, and most preferably between about 1150° C. and about 1200° C. Generally, the peak temperature in the combustion chamber is about 900° C. or higher, preferably about 950° C. or higher. In a preferable embodiment, the peak temperature in the combustion chamber is between about 1000° C. and about 1150° C., more preferably between about 1050° C. and about 1100° C.

Preferred is an average temperature of the combustion chamber between about 1050° C. and about 1250° C., most preferably between about 1150° C. and about 1200° C.

Preferably, the burners are at the same side of the furnace, making an angle of less than about 45°, preferably between about 0° (i.e. parallel position) and about 30°. This design allows an even distribution of the heat and allows sufficient time for heating up the reaction chamber. The hot combustion gasses run around the larger part of the furnace, and thereby an even distribution of heat is achieved.

Preferably, the amount of oxygen in the combustion air is an excess of about 1 vol % or less, preferably about 0.5 vol % or less, and most preferably about 0.3 vol %. A lower excess of oxygen in the combustion air reduces NOx formation.

Preferably, the step of alternatingly causing one of the regenerative burners to perform a combustion operation includes:
a. supplying hot combustion air of about 600° C. to about 1000° C. of a regenerator of a first regenerative burner to its burner, and heating up the reaction chamber of the furnace by hot combustion gas of burning fuel;
b. maintaining an average temperature of about 1000° C. to about 1250° C. in the combustion chamber;
c. exhausting about 70 vol % to about 95 vol % of said hot combustion gas to a regenerator of a second regenerative burner;
d. storing heat of the hot combustion gas in a medium of the regenerator of the second regenerative burner;
e. alternating steps a-d in the second and first regenerative burners.

Preferably, the regenerator comprises a ceramic medium, or consists of a ceramic medium, wherein the ceramic medium preferably consists of ceramic balls of $Al_2O_3$.

Preferably, the process further comprises the steps of
a. exhausting cold combustion gas of about 100° C. to about 280° C. from the regenerator of the second regenerative burner,
b. supplying said cold combustion gas to a mixing zone, to which about 30 vol % to about 5 vol % hot combustion gasses is supplied through a valve, and releasing the combustion gas flow, which is preferably at a temperature of about 250° C. to about 400° C. for further use or expelling, for example through a chimney;
c. heating combustion air in the regenerator of the first regenerative burner to about 600° C. to about 1000° C. for use in the burner,
d. alternating steps a-c in the second and first regenerative burners The about 5 to about 30 vol % hot combustion gas of step b preferably is released through a valve which valve is used to keep the pressure in the combustion chamber at the required pressure, like between about 0.2 and about 3 mbarg.

The combustion chamber preferably comprises an exhaust flue, for exhausting the amount of about 5 to about 30%, preferably about 15% to about 25% of the hot gas from the combustion chamber, which amount is steered as to keep the pressure in the reaction chamber at a level of about 0.2 to about 3 mbarg.

Preferably, the pressure in the combustion chamber is kept between about 0.4 to about 2 mbarg, and even more preferably between about 0.4 and about 1.5 mbarg, and most preferably between about 1.0 and about 1.5 mbarg.

In a further embodiment, the regenerative burner is a gas burner, preferably using methane gas and/or propane gas. Preferably, the regenerative burner is a gas burner using natural gas.

It is an advantage of the present invention that in this way a process is provided which can be stably practiced on a commercial scale with relatively low NOx emission.

The present invention preferably provides a process wherein the $NO_x$ emissions are below about 200 mg/Nm$^3$, preferably below about 150 mg/Nm$^3$ at 3 vol % $O_2$ (oxygen) at a temperature of about 1200° C. of the combustion chamber.

Besides the low NOx emission, furnaces with regenerative burners profit as well of lower $CO_2$ emissions by the energy savings.

The reaction chamber comprises a dome shaped wall separating the reaction chamber from the combustion chamber, which generally is from silicon carbide. The reaction chamber is heated through the dome.

It is impossible to heat the dome completely with the same energy over the whole surface. Hence, a heat gradient will be observed, which can be measured and/or modelled.

The heat gradient over the whole dome in the combustion chamber is generally less than about 250° C., preferably less than about 200° C. The gradient will in practice often be higher than about 20° C., and is preferably between about 30° C. to about 100° C. In a most preferred embodiment, the gradient is about 60° C. or less, like for example between about 40° C. and about 60° C. The gradient in traditional burners often is about 400° C. or higher.

Preferably, the burning operation in the combustion chamber is such as to maintain an average temperature of about 450° C. to about 600° C. in the reaction chamber.

The reaction in the reaction chamber can be conducted for a suitable time, which includes an average reaction time of about 30 minutes to about 2 hours. The throughput can be regulated by steering the input and by allowing mixing rakes in the reaction chamber to push the reaction mixture to the outside of the chamber.

Generally, the process of the present invention relates to a continuous industrial process for the production of potassium sulphate. Preferably, the reaction chamber with the regenerative burner according to the present invention has a production capacity of about 30 tons per day, even more preferably about 35 ton per day or more.

The present invention furthermore provides, the use of regenerative burners in a Mannheim process for producing potassium sulphate, wherein the pressure in the combustion chamber is kept between about 0.2 and about 3 mbarg.

As explained, preferably, the pressure is kept between about 0.4 to about 2 mbarg, and even more preferably between about 0.4 and about 1.5 mbarg, and most preferably between about 1.0 and about 1.5 mbarg.

The foregoing and other objects, features and advantages of the present invention will be apparent to those skilled in the art from the following description of drawings and appended claims.

BRIEF DESCRIPTION OF THE DRAWINGS

FIG. 1 is a schematic cross-sectional view of the combustion chamber and related sections.

DESCRIPTION OF ILLUSTRATIVE EMBODIMENTS

The term "dome" or "dome shaped surface" used herein refers to an arcuate, dome shaped wall which is heat conductive.

The term "$NO_x$" is shorthand for molecules containing one nitrogen and one or more oxygen atoms and in particular nitric oxide (NO) and nitrogen dioxide ($NO_2$). It is not meant to include nitrous oxide ($N_2O$). $NO_x$ gases are usually produced from the reaction among nitrogen and oxygen during combustion of fuels, such as hydrocarbons, in air; especially at high temperatures.

The term "sulfuric acid" means sulfuric acid of at least about 90% concentration, and preferably at least about 91, 92, 93 or 94% concentration or above, more preferably about 95, 96, 97, 98 up to 99% concentration. Generally, the sulfuric acid concentration is about 98% or lower.

The terms "heating chamber" and "combustion chamber" have both the same meaning and refer to the upper chamber of the (muffle) furnace where the combustion of the fuel occurs.

The term "heat regenerating", "heat regeneration" means, heat from the combustion chamber is intermittently stored in a storage medium of a regenerator. To accomplish this the hot exhaust gas is brought into contact with the heat storage medium, then cold air is heated up while cooling down the heat storage medium while absorbing the heat.

The term "HCl gas" means gas/gases released during the production process of potassium sulphate. The exhaust gas comprises traces of HCl gas but may comprise other gasses as well, like $CO_2$, $N_2$ and $O_2$ and may further comprise water vapor.

The term "combustion air" means the air that is supplied to the burner.

The terms "flue gas" or "combustion gas" means gas/gases released during the combustion of the fuel, which can be released partly through the exhaust of the combustion chamber.

The pressure is given in mbarg (milli bar gauge), which is the over or under pressure relative to the ambient pressure. 1 mbar is 100 Pa. Hence, 0.2 to 3 mbarg is 20-300 Pa pressure above ambient pressure, while −0.2 to −3 mbarg is 20 to 300 Pa under pressure relative to ambient pressure.

The process of production of potassium sulphate is done in a furnace which is generally denoted as a muffle furnace. The furnace comprises a combustion (heating) chamber at the top and a reaction chamber underneath. The reaction chamber has a top surface which is preferably dome shaped towards the combustion chamber. The dome generally is made of silicium carbide.

Initially, potassium chloride (KCl) and sulphuric acid ($H_2SO_4$) are dosed in the reaction chamber through one or two separate pipes and an exothermic reaction occurs. The ratio of sulfuric acid to potassium chloride generally is between about 1.0 to 1.2, preferably about 1.02 to 1.1, more preferably between about 1.05 to 1.1. The dosing of $H_2SO_4$ may be controlled by a mass flow device (not shown) which controls an electric driven plug valve.

Because the second step of the reaction is endothermic (formula 2 above), heat needs to be supplied to the reaction chamber. This heat is supplied by burning a hydrocarbon source like gas or fuel in the combustion chamber. The burners can use for example preheated heavy fuel which is pulverized with air and burned into the combustion chamber by a regenerative burner. It is preferred for low S (such as $SO_2$) and fine dust emission, to use gas and more in particular natural gas as fuel. Natural gas can be methane-rich natural gas. Such methane-rich natural gas may be referred to as "methane gas".

In this way the reaction chamber, through its upper surface (the dome), is heated over his whole surface.

FIG. 1 depicts a schematic view of the combustion chamber and related sections.

In this FIGURE, 1 denotes the combustion chamber of a muffle furnace. 2 and 3 are the two burners of a regenerative burner system. As depicted in the FIGURE, burner 2 burns natural gas, from supply 4 through pipe line 5. Valve 6 is open, to allow gas to be supplied to the burner. While burner 2 is active, the line 7 to burner 3 is closed by valve 8.

The regenerative burner systems further comprises regenerators 19 and 20. While burner 2 is active, flue gas is exhausted through regenerator 20. The flue gas can for example have a temperature of about 1100° C. to about 1200° C., and this gas is cooled to about 200° C. in the regenerator. The flue gas is exhausted through line 9, while valve 10 is open and valve 11 is closed. The flue gas is sucked by fan 12 through line 13.

In the meantime, fan 14 provides fresh air to burner 2 through line 15 and 16, while valve 17 is open, and valve 18 is closed. The air is heated from about 20° C. to about 800-1000° C.

Aside from the flue gas exiting through the regenerator, some gas is exhausted through exhaust 21 and line 22. The line 22 comprises a valve 23 which can be used to keep the required pressure in the combustion chamber. The hot flue gas can be mixed with cold flue gas from line 13 in mixer 24. The resultant flue gas can be expelled through a line 25 provided with a further valve 26 to regulate the pressure in the combustion chamber. The gas can be expelled through chimney 27. However, the gas has a temperature of about 300° C. to about 400° C., and can be used to heat other streams first.

Generally, about 5 to about 30 vol %, preferably about 10 to about 25 vol %, and most preferably between about 15 and about 25 vol % of the flue gas is removed through the exhaust 21 of the combustion chamber.

The exhaust for the hot combustion gas from the combustion chamber preferably is provided with means to regulate a certain pressure in the combustion chamber, such as valve 23, preferably in combination with a second valve in series, like for example valve 26.

The remainder of the flue gas, about 95-70 vol %, preferably about 90-75 vol %, and more preferably about 85-75 vol % is used to regenerate the heat of the flue gas through the regenerative burner system.

For example, the first combustion can be done in burner 2. During this firing of burner 2, a second regenerative burner performs a heat-regenerating operation sucking up about 75% to about 85%, by total weight of the flue gas (or combustion gas) released from the combustion step, and storing i.e. absorbing its heat in regenerator 20. After a preset time of between about 45 seconds to about 90 seconds, the burners are switched. Subsequently burner 3 fires, using combustion air that is heated by the heat in the regenerator 20. When burner 3 is firing, valves 8, 11 and 18 are open, while 6, 10 and 17 are closed, so that gas and combustion air is supplied to burner 3, and flue gas is drawn through regenerator 19.

Combustion is continuously performed alternating between the burners, and the combustion gas generated therein is continuously recovered through heat i.e. energy recuperation in the regenerator of the other regenerative burner. The efficiency of the process is based on the alternating performance of the combustion and the heat recovery operation at the burners, e.g. burner 2 fires and regenerator 20 absorbs, then burner 3 fires and regenerator 19 absorbs.

The dome is heated by convection and radiation while the combustion chamber is at a temperature between about 950° C. and about 1300° C., preferably about 1000° C. and about 1300° C. The average temperature of the furnace preferably is between about 1100° C. and about 1240° C. and most preferably between about 1150° C. and about 1200° C. In another preferred embodiment, the average temperature of the furnace is between about 1000° C. and about 1150° C.

The method of the invention allows an uniform heated dome and thereby provides a substantial increase of the dome life time due to less temperature gradients, which is a distinct advantage.

The present energy recovery process is advantageous over a typical furnace of the prior art because in the latter process only hot combustion air temperatures of about 350° C. to about 550° C. are reached depending of the material in the applied heat exchanger to pre-heat the combustion air with the flue gas.

The energy saving is between about 7% and about 20% on gross calorific amount, depending on the quality of the furnace and heat exchangers despite changing from fuel to natural gas (which generally increases energy consumption with about 5-10%).

Assuming burner 2 fires, during the recuperation, the flue gas exiting the regenerator 20 has a temperature range of about 100° C. to about 280° C., preferably of about 100° C. to about 250° C., more preferably of about 150° C. to about 220° C.

Hot combustion gas is generally partly expelled through an exhaust 21. A pressure regulator 23 is preferably positioned in the exhaust pipe 22 to adapt the required amount of positive pressure on the dome. By controlling the amounts of hot combustion gas used for heat generation in the regenerators and of the gas expelled through the exhaust, the pressure in the combustion chamber is preferably kept at a pressure of about 0.2 to about 3 mbarg, more preferably of about 0.5 to about 2 mbarg, and most preferably of about 0.9 to about 1.2 mbarg.

The exhaust gas may be used for further heat exchange and/or may be mixed with colder air for further use, or before expelling. For example, before expelling the gas through a chimney, both exhaust flows can be mixed so that the gas entering the chimney preferably has a temperature of between about 300° C. and about 370° C.

The gaseous hydrochloric acid (HCl) which is released during the production process from the reaction chamber may enter into the combustion chamber through the dome shaped surface if the dome comprises some cracks. The combustion exhaust pressure of the combustion chamber generally exceeds the pressure of the HCl gas in the reaction chamber. By keeping the pressure in the combustion chamber sufficiently high, HCl exhaust gas permeation through the dome towards the combustion chamber is (largely) prevented.

To accomplish this important pressure control, preferably a second damper valve (pressure control valve 26) is placed on the combined flue gasses before the chimney when high chimney draft occurs.

Hence, generally, the pressure in the combustion chamber is preferably regulated by two pressure control valves in series.

The pressure in the reaction chamber generally will be between about −3 to about −0.2 mbarg, preferably between about −1 and about −0.3 mbarg. A slight underpressure prevents HCl gas from the reaction chamber to escape into the air.

In comparison with fuel fired furnaces with a NOx emission of about 650 mg/Nm$^3$@3 vol % $O_2$, the NOx emission with gas regenerative burners can be reduced by about 80% reaching emissions of about 150 mg/Nm$^3$@3% $O_2$ or less, like for example about 135 mg/Nm$^3$@3 vol % $O_2$, this at furnace temperatures of about 1150° C. to about 1200° C.

It is an advantage of the present invention that regulating the amount of exhaust gas in the (muffle) furnace, the pressure inside the combustion chamber can be effectively controlled. It is possible to keep the overpressure in the combustion chamber and to preclude/control the HCl gas to diffuse through the dome into the combustion chamber of the furnace. This has the advantage of avoiding HCl corrosion in the combustion equipment.

Further, by the higher gas velocities the flame of the burner is more evenly distributed over the global dome and allows lower peak temperatures in the flame allowing lower $NO_x$ production.

The regenerators 19, 20 preferably comprise a ceramic medium, wherein the ceramic medium preferably consists of ceramic heat exchange material, such as for example balls of $Al_2O_3$.

Generally, the regenerative burners are fuel burners or gas regenerative burners, more preferably natural gas regenerative burners or fuel burners converted into (natural) gas regenerative burners. The advantage of the gas regenerative burner over a fuel regenerative burner is that with natural gas lower S and fine dust emissions are obtained.

One other advantage of the gas regenerative burners of the present invention over traditional fuel burners is that the energy consumption can be reduced with between about 5%-20% by preheating the combustion air to levels of about 900° C. In the same burner set-up, changing from fuel to gas generally leads to an increase in energy consumption of about 5-10%, hence, the actual improvement in energy consumption is about 10-30%. Also the process is more efficient as the heat can be recuperated at the muffle furnace itself while the remainder of the energy content makes a second recuperation step possible.

In a preferred embodiment, the regenerative burners are controlled by one or more programmable logic controller (PLC). By way of cascading on and off the burners by PLC, the furnace's efficiency can be optimized and the $NO_x$ production can be minimized drastically.

In a yet further embodiment, the reaction chamber of the furnace comprises a dome shaped silicon carbide (SiC) wall separating the reaction chamber from the combustion chamber, the apex of said dome wall being positioned between the burners, wherein the dome shaped SiC wall is heated having a heat gradient over the whole dome wall of less than about 250° C., preferably between about 30° C. and about 150° C., more preferably between about 30° C. and about 100° C. Accordingly, the reaction chamber has less hot spots, less steep temperature gradient in the dome and therefore less maintenance on the dome.

According to another embodiment of the invention there is provided the use of regenerative burners in a Mannheim process in a muffle furnace, comprising a combustion chamber and a reaction chamber, for producing potassium sulphate while maintaining a pressure in of about 0.2 to about 3 mbarg in the combustion chamber.

Although specific embodiments have been described, these are examples only and are not limiting upon the scope of the invention.

EXAMPLES

Example 1

A Mannheim muffle furnace was revamped by building a set of regenerative burners for methane gas. The methane gas was natural gas. The angle between the two burners was about 20°. Firing time is adjustable, and is generally about 65 sec.

The operation ran smoothly, and the average temperature in the combustion chamber could be held constant at a temperature between about 1150° C. and about 1200° C., with a gradient of about 50° C. The NOx production was about 135 mg/Nm³ at 3 vol % $O_2$. The exhaust temperature of the hot combustion gas was about 1000° C., which is higher than the exhaust gas of a fuel furnace. Nevertheless, the energy improvement was about 20%.

The pressure in the combustion chamber was kept at about 1 to about 1.2 mbarg by two valves; one in the exhaust for the hot combustion gas, and one in the line to the chimney, after the mixing chamber where the cold combustion gases from the regenerator and the hot combustion gases from the exhaust were mixed. The pressure in the reaction chamber was about −0.5 mbarg.

Example 2

Another Mannheim muffle furnace was revamped with a set up as in example 1. The average temperature in the combustion chamber was held constant at a temperature between about 1050° C. and 1100° C. The NOx production was between about 135 mg/Nm³ and 150 mg/Nm³. The energy improvement was about 25%.

The invention claimed is:

1. A process for the production of potassium sulphate by conversion of potassium chloride and sulphuric acid using a muffle furnace, said furnace comprising a reaction chamber and a combustion chamber,
    wherein potassium chloride (KCl) and sulphuric acid ($H_2SO_4$) are reacted to form potassium hydrogen sulfate ($KHSO_4$), and wherein in the reaction chamber potassium chloride (KCl) and potassium hydrogen sulfate ($KHSO_4$) are reacted to form potassium sulphate while supplying heat to the reaction chamber from the combustion chamber,
    wherein the combustion chamber has at least a pair of regenerative burners and wherein the process comprises the steps of alternatingly causing one of the regenerative burners to perform a combustion operation in the combustion chamber to heat the reaction chamber and another one of the regenerative burners to perform a heat-regenerating operation in a regenerator,
    wherein heat-regenerating means that heat from the combustion chamber is intermittently stored in a storage medium of a regenerator,
    wherein the pressure in the combustion chamber is kept at a pressure of between 0.2 and 3 mbarg.

2. Process according to claim 1, wherein the peak temperature in the combustion chamber is between 900° C. and 1300° C.

3. Process according to claim 1, wherein the furnace comprises a refractory dome, wherein the process includes:
    a. supplying hot combustion air of 600° C. to 1000° C. of a regenerator of a first regenerative burner to its burner and heating up the refractory dome of the furnace by hot combustion gas from burning fuel;
    b. maintaining an average temperature of 1000°° C. to 1250° C. in the combustion chamber;
    c. exhausting 70% to 95% of said hot combustion gas to a regenerator of a second regenerative burner;
    d. storing heat of the hot combustion gas in a medium of the regenerator of the second regenerative burner;
    e. alternating steps a-d in the second and first regenerative burners.

4. Process according to claim 3, wherein the process further comprises
    a. exhausting cold combustion gas of 100°° C. to 280° C. from the regenerator of the second regenerative burner,
    b. supplying said cold combustion gas to a mixing zone together with 30% to 5% of the hot combustion gasses and releasing the combustion gas flow for further use or expelling;
    c. the combustion air is heated up in the regenerator of the first regenerative burner to 600°-1000° ° C. for use in the burner,
    d. alternating steps a-c in the second and first regenerative burner.

5. The process according to claim 1, wherein the regenerator is a ceramic medium.

6. The process according to claim 1, wherein the regenerative burner is a gas burner.

7. The process according to claim 1, wherein the amount of oxygen in the combustion air is an excess of at most 0.5 vol %.

8. The process according to claim 1, wherein the reaction chamber comprises a dome shaped silicon carbide wall separating the reaction chamber from the combustion chamber, wherein the dome is heated having a heat gradient over the whole dome wall of less than 250° C.

9. The process according to claim 1, wherein the combustion chamber comprises an exhaust flue, for exhausting an amount of 5% to 30% of the hot gas from the combustion chamber which amount is steered as to keep the pressure in the combustion chamber at a level of 0.2 mbarg to 3 mbarg.

10. The process according to claim 1, wherein the pressure in the reaction chamber is between −3 mbarg and −0.2 mbarg.

11. The process according to claim 1, wherein the process emits $NO_x$ emissions, wherein the $NO_x$ emissions are below 200 mg/$Nm^3$.

12. The process according to claim 1, wherein the average temperature of the reaction chamber is between 450°° C. and 600° C.

13. The process according to claim 1, wherein the reaction in the reaction chamber is conducted for 30 minutes to 2 hours.

14. Process according to claim 1, wherein the peak temperature in the combustion chamber is between 1000° C. and 1100° C.

15. The process according to claim 5, wherein the ceramic medium consists of ceramic balls of $Al_2O_3$.

16. The process according to claim 6, wherein the gas burner uses natural gas.

17. The process according to claim 8, wherein the dome is heated having a heat gradient over the whole dome wall of between 30° C. and 100° C.

18. The process according to claim 11, wherein the $NO_x$ emissions are below 150 mg/$Nm^3$ at 3 vol % $O_2$ at a temperature of 1200°° C. of the combustion chamber.

\* \* \* \* \*